(12) United States Patent
Ikeda et al.

(10) Patent No.: US 8,950,714 B2
(45) Date of Patent: Feb. 10, 2015

(54) ELONGATED STRUCTURE FOR MOVABLE SECTION

(75) Inventors: Daisuke Ikeda, Fukuoka (JP); Yasuaki Kawanami, Fukuoka (JP); Kouji Terasaki, Fukuoka (JP)

(73) Assignee: Dyden Corporation, Fukuoka (JP)

( * ) Notice: Subject to any disclaimer, the term of this patent is extended or adjusted under 35 U.S.C. 154(b) by 194 days.

(21) Appl. No.: 12/737,858

(22) PCT Filed: Feb. 3, 2010

(86) PCT No.: PCT/JP2010/051504

§ 371 (c)(1),
(2), (4) Date: Apr. 27, 2011

(87) PCT Pub. No.: WO2010/109951

PCT Pub. Date: Sep. 30, 2010

(65) Prior Publication Data

US 2011/0204190 A1    Aug. 25, 2011

(30) Foreign Application Priority Data

Mar. 25, 2009    (JP) .................. 2009-074016

(51) Int. Cl.
*F16L 3/08*    (2006.01)
*H01B 7/08*    (2006.01)
(Continued)

(52) U.S. Cl.
CPC ........... *H01B 7/0823* (2013.01); *H02G 11/006* (2013.01); *H01B 7/041* (2013.01)
USPC ........... 248/74.4; 248/70; 248/74.3; 138/120; 138/106

(58) Field of Classification Search
USPC .............. 138/118, 118.1, 119, 120, 106, 108; 248/74.2, 71, 70, 74.4, 74.3, 73
See application file for complete search history.

(56) References Cited

U.S. PATENT DOCUMENTS 4,702,281 A * 10/1987 Moritz .......................... 138/120

5,343,989 A * 9/1994 Hu et al. ...................... 191/12 R
(Continued)

FOREIGN PATENT DOCUMENTS

| JP | 2001-76547 | 3/2001 |
| JP | 2001-235630 | 8/2001 |

(Continued)

OTHER PUBLICATIONS

International Search Report (Form PCT/ISA/210); International Application No. PCT/JP2010/051504; Date of Completion: Mar. 9, 2010.

*Primary Examiner* — Nkeisha Smith
(74) *Attorney, Agent, or Firm* — Rader, Fishman & Grauer PLLC

(57) ABSTRACT

In an elongated structure for a movable section, a plurality of operational linear elements such as conductive wires are arranged in parallel in a belt-like sheath member, and an outer region of the sheath member, which is defined by a bend of the sheath member, has a larger rigidity than that of an inner region of the sheath member, which is defined by the bend of the sheath member. When the sheath member 2 have the regions exhibiting the different rigidities, and when an external force is exerted on the elongated structure 1 for the movable section, it is apt to bend toward the side of the sheath member having the small rigidity, and the bent portion is maintained at a given curvature which is determined by the entire rigidity of the sheath member 2. Therefore, the elongated structure 1 for the movable section cannot easily meander while the movable end thereof is moved. Also, while the position of the bent portion is shifted, it is possible to stably carry out the movement of the movable end and the shift of the bent portion. In addition, a protective guide structure is not needed, and not only can an installing space for the elongated structure 1 for the movable section become smaller, but also it is possible to cut down a cost necessary for such a protective guide structure.

7 Claims, 11 Drawing Sheets

(51) Int. Cl.
*H02G 11/00* (2006.01)
*H01B 7/04* (2006.01)

(56) References Cited

U.S. PATENT DOCUMENTS

| | | | | |
|---|---|---|---|---|
| 6,215,068 | B1* | 4/2001 | Meier | 174/68.1 |
| 7,240,477 | B1* | 7/2007 | Dunfee et al. | 59/78.1 |
| 7,388,154 | B2* | 6/2008 | Chen et al. | 174/117 F |
| 7,942,169 | B2* | 5/2011 | Komiya et al. | 138/110 |
| 7,950,870 | B1* | 5/2011 | Thompson et al. | 404/6 |
| 2005/0056333 | A1* | 3/2005 | Utaki | 138/120 |
| 2007/0144376 | A1* | 6/2007 | Jostmeier et al. | 101/350.1 |
| 2008/0257440 | A1* | 10/2008 | Ikeda et al. | 138/110 |
| 2009/0178825 | A1* | 7/2009 | Wu et al. | 174/113 R |
| 2011/0011617 | A1* | 1/2011 | Walid | 174/116 |
| 2012/0267164 | A1* | 10/2012 | Reuss et al. | 174/70 R |
| 2013/0075128 | A1* | 3/2013 | Kaihotsu et al. | 174/68.3 |

FOREIGN PATENT DOCUMENTS

| | | |
|---|---|---|
| JP | 2003-083473 A | 3/2003 |
| JP | 2003-267161 | 9/2003 |
| JP | 2008-44490 A1 | 2/2008 |

* cited by examiner

ELONGATED STRUCTURE FOR MOVABLE SECTION

TECHNICAL FIELD

The present invention relates to an elongated structure for a movable section, which is provided in an apparatus including a movable section, such as a mounting apparatus, an industrial robot and so on, and which contains linear conductors or the like.

BACKGROUND ART

In a mounting apparatus for mounting electronic parts on a board in place, a chuck mechanism for holding an electronic part is movable in both widthwise and lengthwise directions. In order to drive the chuck mechanism, a base of the chuck mechanism and a main body of the mounting apparatus are connected to each other by cables feeding electric power and control signals and tubes for feeding air and hydraulic oil. In this mounting apparatus, while the base of the chuck mechanism is moved in widthwise direction, the cables and tubes must follow the moving base. In industrial apparatuses including the mounting apparatus, cables, tubes and so on are provided between movable and fixed sections of an industrial apparatus, and must be moved within a predetermined area in accordance a design of the industrial apparatus. Nevertheless, the cables and tubes having flexibility can be disorderly moved, and the disorder movement of the cables and tubes may be a hindrance to an operation of the industrial apparatus. For this reason, a protective guide structure is proposed for the cables, tubes and so on, and an example of such a protective guide structure is disclosed in JP-2003-083473 A (Patent Literature 1).

The aforesaid conventional protective guide structure includes a synthetic-resin-produced flexible pipe which contains a plurality of cables and such like, and which is connected to a cable-movable end portion and a cable-fixed end portion, and a plurality of bend-regulating units provided on the flexible pipe at regular intervals such that the flexible pipe is surrounded with the bend-regulating units.

CITATION LIST

Patent Literature

Patent Literature 1: JP-2003-083473 A

SUMMARY OF INVENTION

Technical Problem

The conventional protective guide structure is constructed as disclosed in the aforesaid Patent Document, and is held in a given extending attitude and a given bending attitude whereby the protective guide structure can be moved in a predetermined movement area. Thus, by threading cables, tubes and so on through the protective guide structure, it is possible to regulate a movement area for the cables, tubes and so on.

However, in a case where this protective guide structure is used, the bend-regulating units are abutted against each other during the movement of the protective guide structure, and thus are worn away to thereby cause a problem that motes are generated. Also, the bend-regulating units are repeatedly abutted against each other and are repeatedly spaced away from each other, to thereby cause a problem that noises are created.

The present invention has been developed to solve the aforesaid problems, and aims at providing an elongated structure for a movable section, which contains operational linear elements such as conductive wire and such like, which can be moved in a predetermined area, which does not need a protective guide structure, and which can suppress generation of motes and creation of noises.

Solution to Problem (1) An elongated structure for a movable section according to the present invention comprises an elongated sheath member formed of a synthetic resin and having a predetermined rigidity, and a plurality of operational linear elements which are provided in the sheath member so as to be extend from one end of the sheath member from the other end thereof, and through which operational factors are transmitted. The operational linear elements are arranged widthwise in the sheath member in parallel, and the sheath member has a flat belt-like configuration expanding widthwise with respect to the operational linear elements arranged in parallel. The sheath member carrying the operational linear elements is bent midway. One end portion of the sheath member is moved in parallel with respect to the other end portion thereof. An outer region of the sheath member, which is defined by the bend of the sheath member, has a larger rigidity than that of an inner region of the sheath member, which is defined by the bend of the sheath member.

As mentioned above, in the present invention, the operational linear elements, such as electric wires, optical cables and so on, through which electricity, light and so on are transmitted as the operational factors, and such as tubes, pipes and so on, through which air, hydraulic oil and so on are transmitted as the operational factors, are provided in the sheath member so as to be extended from one end of the sheath member to the other end thereof, and are arranged in parallel in the sheath member. The rigidity of the outer region of the sheath member is larger than that of the inner region which is defined as an inner side when the sheath member is bent. Thus, when the sheath member has the regions exhibiting the different rigidities, and when an external force is exerted on the elongated structure for the movable section, it is apt to bend toward the side of the sheath member having the small rigidity, and the bent portion is maintained at a given curvature which is determined by the entire rigidity of the elongated sheath member. Therefore, the elongated structure for the movable section cannot easily meander while the movable end thereof is moved. Also, while the position of the bent portion is shifted, it is possible to stably carry out the movement of the movable end and the shift of the bent portion. In addition, a protective guide structure is not needed, and not only can an installing space for the elongated structure for the movable section become smaller, but also it is possible to cut down a cost necessary for such a protective guide structure. Further, while the sheath member containing the operational linear elements is moved a predetermined area, it is possible to suppress generation of motes and creation of noises as small as possible. Note, an adjustment of the rigidity of the sheath member by either a difference between the thickness of the inner region and the thickness of the outer region or a difference between the rigidity of the inner region and the rigidity of the outer region.

(2) Also, an elongated structure for a movable section according to the present invention comprises a plurality of elongated sheath members formed of a synthetic resin and having a predetermined rigidity, and an operational linear element which is provided in each of the sheath members so as to be extend from one end of each of the sheath members from the other end thereof, and through which an operational factor is transmitted. The sheath members are arranged in parallel, and are securely attached to each other so as to define a belt-like configuration. The sheath members carrying the operational linear elements are bent midway. One end portion of the sheath members is moved in parallel with respect to the other end portion thereof, and an outer region of the sheath members, which is defined by the bend of the sheath members, has a larger rigidity than that of an inner region of the sheath members, which is defined by the bend of the sheath members.

As mentioned above, in the present invention, the operational linear elements, such as electric wires, optical cables and so on, through which electricity, light and so on are transmitted as the operational factors, and such as tubes, pipes and so on, through which air, hydraulic oil and so on are transmitted as the operational factors, are provided in the sheath members so as to be extended from one end of each of the sheath members to the other end thereof, and the sheath members are arranged in parallel, and are securely attached to each other so as to define a belt-like configuration. The rigidity of the outer region of the sheath members is larger than that of the inner region which is defined as an inner side when the sheath members are bent. Thus, when the sheath members have the regions exhibiting the different rigidities, and when an external force is exerted on the elongated structure for the movable section, it is apt to bend toward the side of the sheath members having the small rigidity, and the bent portion is maintained at a given curvature which is determined by the entire rigidity of the sheath members. Therefore, the elongated structure for the movable section cannot easily meander while the movable end thereof is moved. Also, while the position of the bent portion is shifted, it is possible to stably carry out the movement of the movable end and the shift of the bent portion. In addition, a protective guide structure is not needed, and not only can an installing space for the elongated structure for the movable section become smaller, but also it is possible to cut down a cost necessary for such a protective guide structure.

(3) Also, in the elongated structure for the movable section according to the present invention, if necessary, each of the operational linear elements may be biasedly positioned so as to be offset from a central position of the thickness of the sheath member(s) toward a side of the inner region of the sheath member(s).

As stated above, in the present invention, in the case where each of the operational linear elements is biasedly positioned so as to be offset from the central position of the thickness of the elongated sheath member(s) toward the side of the inner region of the sheath member(s), the thickness of the inner region of the sheath member(s) is made smaller than that of the outer region thereof so that the rigidity of the inner region becomes smaller than that of the outer region. Thus, when an external force is exerted on the elongated structure for the movable section, it is apt to bend toward the side of the sheath member(s) having the small rigidity, i.e., toward the inner region of the sheath member(s), and the bent portion is maintained at the given curvature which is determined by the entire rigidity of the sheath member(s).

(4) Also, in the elongated structure for the movable section according to the present invention, if necessary, the outer region of the sheath member(s) may include a high-stiffness portion having a larger stiffness than that of the remaining region of the sheath member(s).

As stated above, in the present invention, in the case where the outer region of the sheath member(s) includes the high-stiffness portion having the larger stiffness than that of the remaining region of the sheath member(s), the rigidity of the inner region becomes smaller than that of the outer region. Thus, when an external force is exerted on the elongated structure for the movable section, it is apt to bend toward the side of the sheath member(s) having the small rigidity, i.e., toward the inner region of the sheath member(s), and the bent portion is maintained at the given curvature which is determined by the entire rigidity of the sheath member(s). Note, it is necessary to eventually unite the high-stiffness portion with the sheath member(s). Accordingly, the high-stiffness portion and the remaining portion of the sheath member(s) may be integrally formed with the sheath member(s). On the other hand, after the high-stiffness portion and the remaining portion of the sheath member(s) are individually produced, the high-stiffness portion may be securely attached to and united with the remaining portion of the sheath member(s).

(5) Also, in the elongated structure for the movable section according to the present invention, if necessary, the sheath member(s) may have a high-stiffness member which is securely attached to an outer surface thereof, and which has a larger stiffness than that of the sheath member(s).

As stated above, in the present invention, in the case where the sheath member(s) has the high-stiffness member which is securely attached to the outer surface thereof, and which has the larger stiffness than that of the sheath member(s), the rigidity of the inner region becomes smaller than that of the outer region. Thus, when an external force is exerted on the elongated structure for the movable section, it is apt to bend toward the side of the sheath member(s) having the small rigidity, i.e., toward the inner region of the sheath member(s), and the bent portion is maintained at the given curvature which is determined by the entire rigidity of the sheath member(s). Note, it is necessary to eventually unite the high-stiffness member with the sheath member(s). Accordingly, the high-stiffness member and the remaining portion of the sheath member(s) may be integrally formed with the sheath member(s). On the other hand, after the high-stiffness member and the remaining portion of the sheath member(s) are individually produced, the high-stiffness member may be securely attached to and united with the remaining portion of the sheath member(s).

(6) Also, in the elongated structure for the movable section according to the present invention, if necessary, the high-stiffness member may be formed of a plurality of separable stripes.

As stated above, in the present invention, in the case where the high-stiffness member is formed of the plurality of separable stripes, it is possible to vary the rigidity of the outer region of the sheath member(s) by removing at least one separable strip from the high-stiffness member. Thus, even on site for installing the elongated structure for the movable section, the rigidity of the outer region of the sheath member(s) can be regulated by removing at least one separable strip from the high-stiffness member. Namely, it is possible to easily and quickly carry out fine regulation of the rigidity of the outer region on site.

(7) Also, in the elongated structure for the movable section according to the present invention, if necessary, the sheath member(s) may have a plurality of slits formed in the outer region thereof at given regular intervals in a direction which is intersected with a longitudinal axis of the sheath member(s).

As stated above, in the present invention, in the case where the sheath member(s) has the plurality of slits formed in the outer region thereof at given regular intervals in a direction which is intersected with a longitudinal axis of the elongated sheath member(s), the sheath member(s) can be easily bent so that the bent portion of the elongated structure for the movable section can be held so as to have a relatively large curvature, and thus it is possible to move the elongated structure for the movable section in a relatively small movement area. Also, the curvature of the bent portion of the elongated structure for the movable section can be further regulated by suitably setting an extent in which the slits should be formed, a depth of the slits, and a pitch of the slits. Note, the formation of the slits can be carried out by using, for example, a laser beam machining in which a surface of a belt-like blank for the sheath member is irradiated with a laser beam one after another.

(8) Also, an elongated structure for a movable section according to the present invention comprises at least one flexible cable member containing at least one linear core element and/or at least one tube element, and a plurality of block members which are securely attached to a peripheral part of the cable member, and which are closely and longitudinally arranged along the cable member.

As stated above, in the present invention, the plurality of block members are closely and longitudinally arranged on the cable member containing the at least one linear core element through which electricity or light is transmitted as an operational factor and/or at least one tube element through which air or hydraulic oil is transmitted as an operational factor. Accordingly, even if it is tried that the cable member is bent so that the surface of the cable member, on which the block members are provided, is defined as the inner surface, the bend is prevented because the block members are abutted against each other. On the other hand, when it is tried that the cable member is bent so that the surface of the cable member, on which the block members are provided, is defined as the outer surface, the block members can be separated from each other, and thus the bend of the cable member cannot be hindered by the block member, to thereby allow the bend of the cable member. In short, the cable member can be bent only in the direction so that the surface of the cable member, on which the block members are provided, is defined as the outer surface. Accordingly, while an end portion of the elongated structure for the movable section is moved, a unintentional and unnecessary bend of the elongated structure for the movable section cannot take place so that the movement of the end portion can be stably carried out. In addition, a protective guide structure is not needed, and not only can an installing space for the elongated structure for the movable section become smaller, but also it is possible to cut down a cost necessary for such a protective guide structure. Further, while the cable member containing the at least one linear core element and/or at least one tube element is moved a predetermined area, it is possible to suppress generation of motes and creation of noises as small as possible because there are no parts to be worn.

(9) Also, in the elongated structure for the movable section according to the present invention, if necessary, a plurality of flexible cable members may be arranged in parallel to define a belt-like configuration, and two adjoining flexible cable members are securely attached to and united with each other. Also, the plurality of block members may be arranged so as to be adjoined to the plurality of flexible cable members arranged in parallel.

As stated above, in the present invention, in the case where the plurality of block members are arranged so as to be adjoined to the plurality of flexible cable members which are arranged in parallel to define the belt-like configuration, the cable members are easily bent in only the directions perpendicular to the direction in which the united cable members are arranged in parallel, and thus it is hard to bend the united cable members in the other directions. By combining the united cable members, which are hard to be bent in the other directions, with the block members for regulating the bend of the united cable members, the united cable members exhibit a stiffness against the other bends except for the bend of the united cable members in which the surface of the united cable members, on which the block members are provided, is defined as an outer surface. Namely, when the united cable members is subjected to an external, the united cable members can be bent in only the bending direction so that the surface of the united cable members, on which the block members are provided, is defined as the outer surface. Also, the bent portion of the united cable members is maintained at a given curvature which is determined by the entire rigidity of the united cable members arranged in parallel. Thus, the elongated structure for the movable section cannot easily meander while the position of the bent portion is shifted, and thus it is possible to stably carry out the shift of the bent portion while one end of the end of the elongated structure for the movable section is moved. Also, since not only the cable members are securely attached to and united with each other, but also the cable members are securely attached to and united with the block members, it is possible to maintain a large attachment strength of the block members against the bend of the cable members. Thus, although the position of the bent portion is continuously shifted, the block members can be prevented from coming off the cable members, and the block members can maintain the function of regulating the bending direction over a long time.

(10) Also, in the elongated structure for the movable section according to the present invention, if necessary, the cable member may be formed so as to have a single belt-like configuration, and may contain a plurality of linear core element and/or at least one tube element arranged widthwise in the cable member in parallel. Also, the plurality of block members may be arranged on one of two outer peripheral flat portions of the cable member.

As stated above, in the present invention, in the case where the plurality of block members are arranged on one of the two outer peripheral flat portions of the cable member having the single belt-like configuration, it is possible to obtain a sufficient contact area between the cable member and the block members. Thus, when the cable member and the block members are adhered to and united with each other so as to define a united structure, it is possible to surely maintain the united structure, and it is possible to obtain an adhesive strength of the block members against a bend of the cable members. Also, although the position of the bent portion is continuously shifted, the block members can be prevented from coming off the cable members, and the block members can maintain the function of regulating the bending direction over a long time.

(11) Also, in the elongated structure for the movable section according to the present invention, if necessary, the plurality of block members may exhibit a larger rigidity than that of the cable member(s).

As stated above, in the present invention, in the case where the plurality of block members exhibit the larger rigidity than that of the cable member(s), although it is tried that the cable member(s) is bent in a direction so that the surface of the cable member(s), on which the block members are provided, is not defined as an outer surface, the bend of the cable member(s) is prevented by the block members which exhibit the larger rigidity than that of the cable member(s), i.e., which are hard to be deformed even if an external force is exerted on the block members. Thus, it is possible to surely maintain a condition that the cable member(s) can be bent in only the direction so that the surface of the cable member(s), on which the block members are provided, is defined as the outer surface. Accordingly, while one end of the elongated structure for the movable section is moved, a unnecessary deformation of the cable member(s) cannot take place so that not only can the position of the bent portion be smoothly shifted, but also the movement of the elongated structure for the movable section can be stably carried out.

(12) Also, in the elongated structure for the movable section according to the present invention, if necessary, a flexible sheet member may be intervened between the plurality of block members and the cable member(s).

As stated above, in the present invention, in the case where the sheet member is intervened between the plurality of block members and the cable member(s), the cable member(s) is united with the sheet member, and the block members can be closely contacted with the sheet member. Thus, after the block members and the cable member(s) are individually produced, when the block members and the cable member(s) are united with each other, it is possible to obtain the maximum contact area between the sheet member and the block members so that the block members are strongly united with the sheet member. If the cable member(s) and the block members are directly united with each other, it is impossible to obtain a sufficient contact area between the cable member(s) and the block members, and thus an enough attachment strength cannot be expected. Nevertheless, the block members can be closely contacted with the sheet member with the sufficient contact area. Thus, it is possible to obtain a large adhesive between the sheet member and the block members, so that the block members can be adhered with a suitable adhesive strength to the sheet member. As a result, the block members and the cable member(s) can be strongly united with each other, and thus it is possible to use the elongated structure for the movable section without any problems.

DESCRIPTION OF EMBODIMENTS

First Embodiment of the Invention

Figure 1:
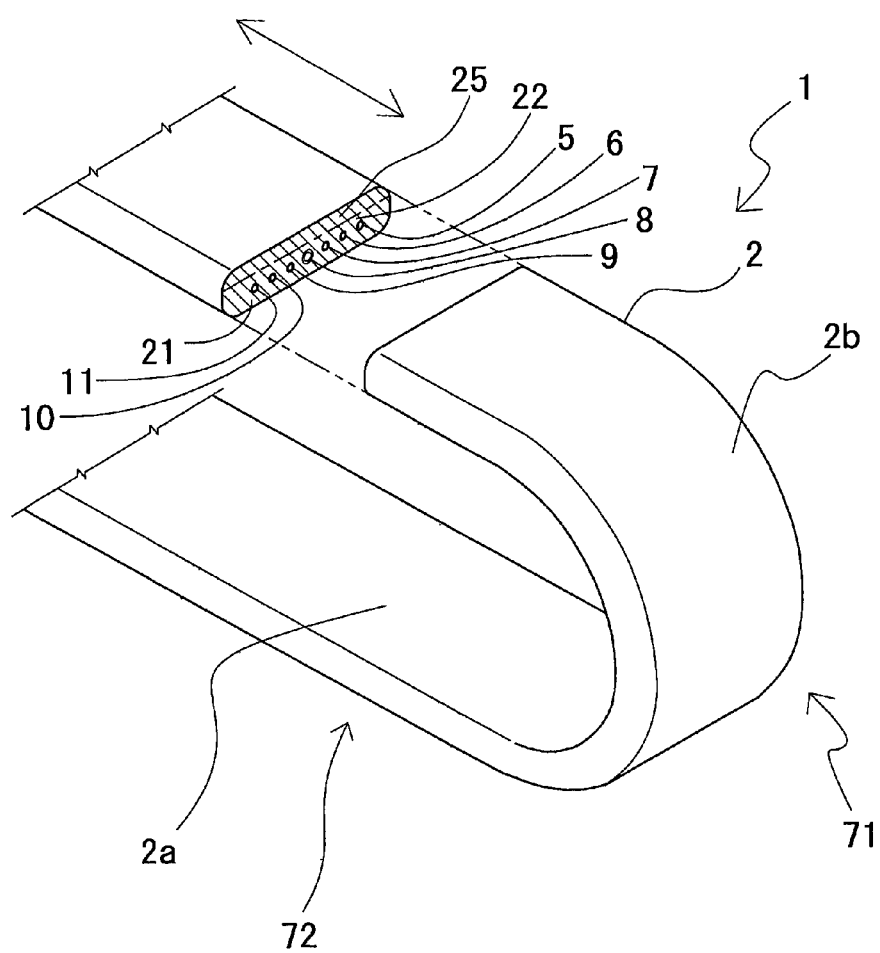
FIG. 1 is a schematic perspective view of an elongated structure for a movable section according to a first embodiment of the present invention.

With reference to FIG. 1, an elongated structure for a movable section according to the first embodiment of the present invention will now be explained below.

In FIG. 1, the elongated structure 1 for the movable section includes a sheath member 2 which is formed as an elongated flexible member, and a plurality of operational flexible linear elements 5, 6, 7, 8, 9, 10 and 11 which are provided in the sheath member 2 so as to be extend from one end of the sheath member 2 from the other end thereof, and through which operational factors are transmitted.

The aforesaid sheath member 2 has an elongated flat belt-like configuration having a suitable thickness, and the operational linear elements 5, 6, 7, 8, 9, 10 and 11, such as conductor wires, tubes and so on for transmitting the operational factors such as electricity, air and so on, are arranged widthwise in the sheath member 2 in parallel so as to be spaced away from each other. The sheath member 2 is formed of a synthetic resin material, having a predetermined rigidity, such as vinyl-chloride-based resin, polyethylene-based resin, polyurethane-based resin, polyester-based resin or the like, so that the elongated structure 1 for the movable section is prevented from being bent due to a self-weight.

Each of the operational linear elements 5, 6, 7, 8, 9, 10 and 11 has a predetermined flexibility so as to exhibit durability to snapping or damage of the operational flexible liner elements even if they are repeatedly bent.

Each of the operational linear elements 5, 6, 7, 8, 9, 10 and 11 is biasedly positioned so that the center of each of these elements is offset from a central position of the thickness of the sheath member 2 toward one surface 2a of the sheath member 2 by a predetermined distance. As shown in FIG. 1, the elongated structure 1 for the movable section is provided in an attitude that it is bent into a U-shape so that the one surface 2a of the sheath member 2 is defined as an inner surface. Accordingly, a thickness of an outer region 22 of the sheath member 2, which is measured from the other surface 2b of the sheath member 2 to the operational linear elements 5, 6, 7, 8, 9, 10 and 11, is larger than a thickness of an inner region 21 of the sheath member 2, which is measured from the one surface 2a of the sheath member 2 to the operational linear elements 5, 6, 7, 8, 9, 10 and 11.

Also, a stiffness of the outer region 22 of the sheath member 2 is equal to that of the inner region 21 thereof, provided that the below-mentioned high-stiffness portion 25 is withdrawn from consideration.

In this elongated structure 1 for the movable section, when the thickness of the outer region 22 of the sheath member 2 is larger than that of the inner region 21, and when these regions has the same stiffness, it is hard to bend the outer region having the large thickness, but it is easy to bend the inner region having the small thickness, because a rigidity of the outer region having the large thickness is higher than that of the inner region having the small thickness. Accordingly, when forces for bending the elongated structure 1 for the movable section into a U-shape are exerted on the ends thereof, the elongated structure 1 for the movable section may be easily bent in a given direction into the U-shape so that the surface 2a of the sheath member 2 is defined as the inner surface, as shown in FIG. 1.

Since a curvature of the bent portion 71 of the elongated structure 1 for the movable section is determined by the stiffness and self-weight of the elongated structure 1 for the movable section, it is possible to give a setting of desirable curvature to the bent portion 71 by suitably regulating the thicknesses of the inner and outer regions 21 and 22 forming the sheath member 2 and the stiffness of the inner and outer regions 21 and 22.

Note that the strip-like high-stiffness portion 25 having a larger stiffness than that of the remaining region of the sheath member 2 may be provided on the outer region 22 of the sheath member 2, if necessary. In this case, the inner region having the small stiffness has a lower rigidity than that of the outer region having the large stiffness, and thus it is easy to bend the inner region having the small stiffness. Accordingly, similar to the aforesaid case, when forces for bending the elongated structure 1 for the movable section into a U-shape are exerted on the ends thereof, the elongated structure 1 for the movable section exhibits a characteristic so as to be easily bent in a given direction into the U-shape so that the surface 2a of the sheath member 2 is defined as the inner surface.

Note that it is possible to regulate the stiffnesses of the respective inner region 21, outer region 22 and high-stiffness portion 25 of the sheath member 2 by selecting a kind of resin used therein, thicknesses thereof and so on.

In production of the sheath member 2, the high-stiffness portion 25 may be integrally formed with the inner and outer regions 21 and 22 together with the operational linear elements 5, 6, 7, 8, 9, 10 and 11. On the other hand, after the high-stiffness portion 25 and both the outer region 22 for the high-stiffness portion 25 and the inner region 21 are independently produced, respectively, the sheath member 2 may be produced by adhering the high-stiffness portion 25 to the outer region 22.

Next, an explanation will now be made how the elongated structure for the movable section according to this first embodiment is used. As shown in FIG. 1, the elongated structure 1 for the movable section is put within a predetermined area in a condition that it is bent into the U-shape. One end of the elongated structure 1 for the movable section is defined as a movable end, and the other end thereof is defined as a fixed end. As the movable end is moved, a position of the bent portion 71 is shifted.

In this case, since the elongated structure 1 for the movable section has the elongated flat belt-like configuration, the elongated structure 1 for the movable section cannot easily meander while the movable end is moved, and while the position of the bent portion 71 is shifted, and thus it is possible to stably carry out the movement of the movable end and the shift of the bent portion 71.

Also, in addition to the stiffness of the sheath member 2 and the offset arrangement of the operational linear elements 5, 6, 7, 8, 9, 10 and 11, when the high-stiffness portion 25 is provided in the outer region 2, not only can the bent portion 71 of the elongated structure 1 for the movable section be maintained at the given curvature, but also it is possible to maintain the linearity of linear portions 72 thereof.

On the other hand, since the elongated structure 1 for the movable section is integrally formed of a synthetic resin material, it is possible to suppress generation of motes and creation of noises as small as possible during the movement of the elongated structure 1 for the movable section.

As mentioned above, in the elongated structure for the movable section according to this embodiment, the operational linear elements 5, 6, 7, 8, 9, 10 and 11, such as electric wires, optical cables and so on, through which electricity, light and so on are transmitted as the operational factors, and such as tubes, pipes and so on, through which air, hydraulic oil and so on are transmitted as the operational factors, are provided in the sheath member 2 so as to be extended from one end of the sheath member 2 to the other end thereof, and the rigidity of the outer region 22 of the sheath member 2 is larger than that of the inner region 21 which is defined as an inner side when the sheath member 2 is bent. Thus, when the sheath member 2 have the regions exhibiting the different rigidities, and when an external force is exerted on the elongated structure 1 for the movable section, it is apt to bend toward the side of the sheath member having the small rigidity, and the bent portion is maintained at a given curvature which is determined by the entire rigidity of the sheath member 2. Therefore, the elongated structure 1 for the movable section cannot easily meander while the movable end thereof is moved. Also, while the position of the bent portion 71 is shifted, it is possible to stably carry out the movement of the movable end and the shift of the bent portion 71. In addition, a protective guide structure is not needed, and not only can an installing space for the elongated structure 1 for the movable section become smaller, but also it is possible to cut down a cost necessary for such a protective guide structure.

In the elongated structure for the movable section according to this first embodiment, the thickness of the outer region 22 of the sheath member 2 is larger than that of the inner region 21 which is defined as the inner side when the sheath member 2 is bent or the high-stiffness portion 25 having the larger stiffness than that of the remaining region of the sheath member 2 is provided on the outer region 22 of the sheath member 2, so that the stiffness of the outer region 22 of the sheath member 2 is made larger than that of the inner region 21 thereof, whereby the elongated structure for the movable section has the tendency toward bending so that the one surface 2a of the sheath member 2 is defined as the inner surface. Nevertheless, instead, a tension member for reinforcing and regulating the stiffness and the elasticity of the sheath member may be provided either in the outer region of the sheath member or on the outer surface of the outer region so that the rigidity of the outer region is made to be larger than that of the inner region, similar to the above-mentioned case, whereby it is possible to limit a bending direction of the elongated structure for the movable section so that not only can a unintentional and unnecessary bend of the elongated structure for the movable section be prevented, but also the bent portion can be set at the given curvature by regulating the rigidity of the sheath member.

Second Embodiment of the Invention

Figure 2:
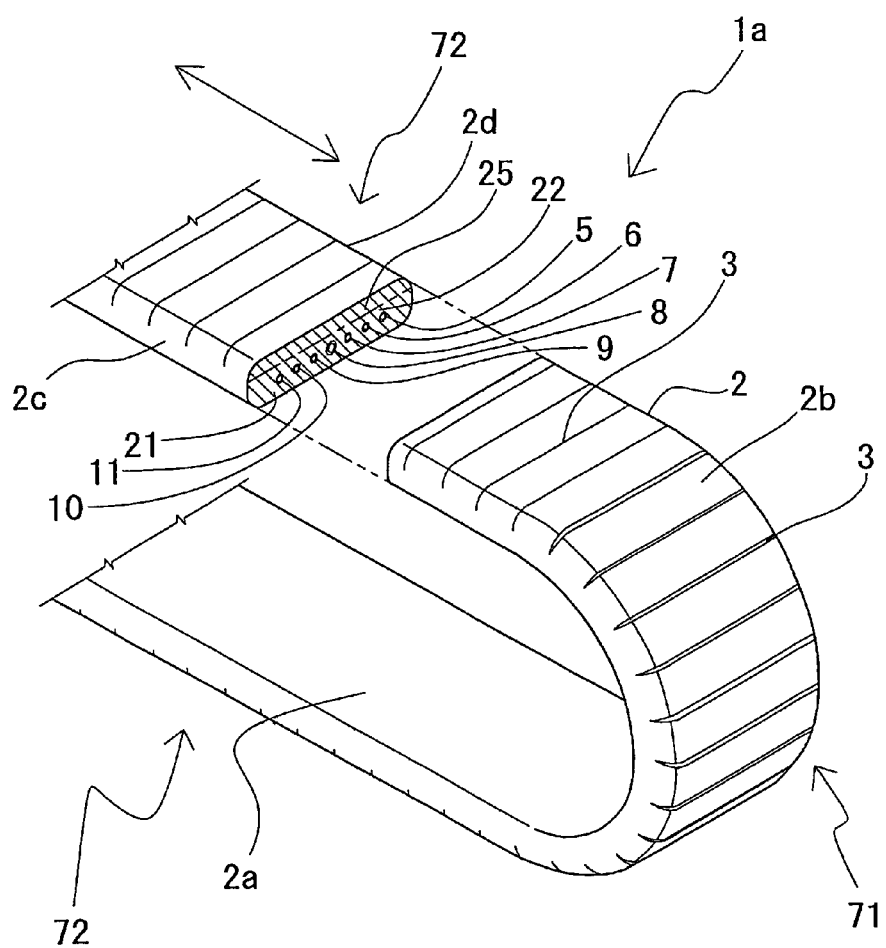
FIG. 2 is a schematic perspective view of an elongated structure for a movable section according to a second embodiment of the present invention.

With reference FIG. 2 a second embodiment of the present invention will now be explained. As shown in FIG. 2, in an elongated structure 1a for a movable section, a plurality of slits 3 are provided in a sheath member 2. Note, in FIG. 2, the same references as in FIG. 1 indicate the corresponding elements, and explanations of these elements are omitted.

As shown in FIG. 2, the plurality of slits 3 are formed in a surface 2b of an outer region of the sheath member 2, which is defined as an outer surface, at given regular intervals in a longitudinal direction of the sheath member 2 so as to be extended from one side face 2c of the sheath member 2 to the other side face 2d through the outer surface 2b thereof. Some of the slits 2 are opened in a U-shaped bent portion 71 of the elongated structure 1a for the movable section, and the remaining slits 3 are closed in linear portions 72 thereof except for U-shaped bent portion 71. Thus, when forces for bending the elongated structure 1a for the movable section into a U-shape are exerted on the ends thereof, the elongated structure 1a for the movable section is bent in a given direction into the U-shape so that a surface 2a of the sheath member 2, in which no slits are formed, is defined as an inner surface.

The formation of the slits 3 can be carried out by using, for example, a laser beam machining in which a surface of a belt-like blank for the sheath member 2 is irradiated with a laser beam one after another, and a curvature of the bent portion 71 of the elongated structure 1a for the movable section can be regulated by suitably setting an extent in which the slits 3 should be formed, a depth of the slits 3, and a pitch of the slits 3.

Note, since a width of the slits 3 is very small, and since the slits 3 are closed in the linear portions 72, it is possible to suppress a flexure of the linear portions 72 as small as possible, to thereby maintain a linearity of the sheath member 2.

As mentioned above, in the elongated structure 1a for the movable section according to this embodiment, the plurality of slits 3 are formed in the sheath member 2, and thus the bent portion 71 of the elongated structure 1a for the movable section can be held so as to have a relatively large curvature. Accordingly, it is possible to move the elongated structure 1a for the movable section in a relatively small movement area.

On the other hand, similar to the aforesaid first embodiment, since the elongated structure 1a for the movable section has the elongated flat belt-like configuration, the elongated structure 1a for the movable section cannot easily meander while the movable end is moved, and while the position of the bent portion 71 is shifted, and thus it is possible to stably carry out the movement of the movable end and the shift of the bent portion 71. Also, since the elongated structure 1a for the movable section is integrally formed of a synthetic resin material, it is possible to suppress generation of motes and creation of noises as small as possible during the movement of the elongated structure 1a for the movable section.

Third Embodiment of the Invention

Figure 3:
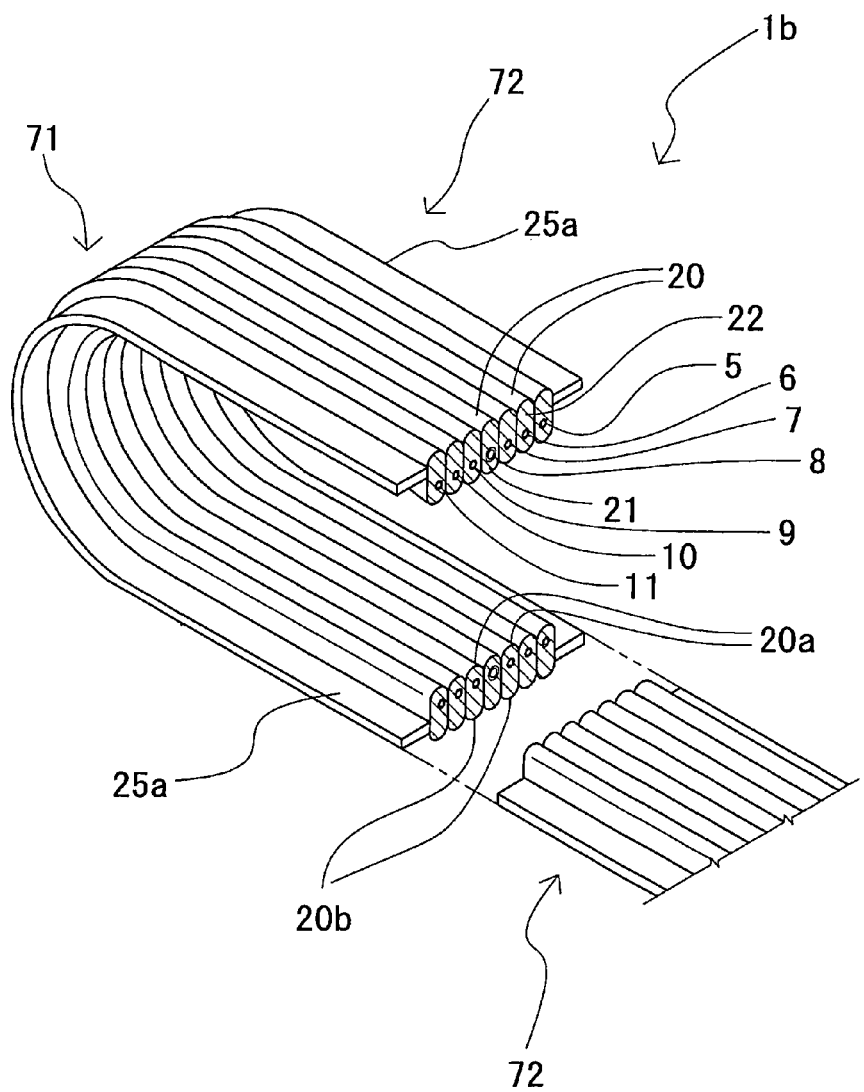
FIG. 3 is a schematic perspective view of an elongated structure for a movable section according to a third embodiment of the present invention.

With reference to FIG. 3, a third embodiment of the present invention will now be explained. As shown in FIG. 3, an elongated structure 1b for a movable section has a flat belt-like configuration in which a plurality of sheath members 20 are arranged in parallel and securely attached to each other.

As shown in FIG. 3, each of the sheath members 20 has generally-oval end faces, and these sheath members 20 are arranged so that the major axes in the generally-oval end faces are parallel to each other. Operational flexible linear elements 5, 6, 7, 8, 9, 10 and 11 are provided in the respective sheath members 20 so that the center of each of the operational linear elements 5, 6, 7, 8, 9, 10 and 11 is offset from the center of the major axis of a corresponding sheath member 2 toward one end 20a of the major axis by a predetermined distance. Thus, a thickness of an outer region 22, which is measured from the other ends 20b of the major axes, defined as the outer ends, to the operational linear elements 5, 6, 7, 8, 9, 10 and 11, is larger than that of an inner region 21, which is measured from the one ends 20a, defined as the inner ends, to the operational linear elements 5, 6, 7, 8, 9, 10 and 11.

On the other hand, high-stiffness members 25a having a larger stiffness than that of sheath members 20 are securely attached to the respective outermost ones of the sheath members 20 arranged in parallel and securely attached to each other. The attachment of the high-stiffness member 25a is carried out at the positions which are offset from the centers of the sheath members 20 toward the other ends 20b of the major axes. Thus, in the elongated structure 1b for the movable section, a stiffness in the side of the other ends 20b of the major axes is larger than that in the side of the one ends 20a. As is apparent from the foregoing, the side exhibiting the small stiffness is more liable to be deformed in comparison with the side exhibiting the large stiffness. Therefore, when forces for bending the elongated structure 1b for the movable section into a U-shape are exerted on the ends thereof, the elongated structure 1b for the movable section may be easily bent in a given direction into the U-shape so that the side of the one ends 20a of the major axes of the sheath members 20 is defined as an inner side.

Similar to the above-mentioned case, when this elongated structure 1b for the movable section is put within a predetermined area in a condition that it is bent into the U-shape, and when the respective ends of the elongated structure 1b for the movable section are defined as a movable end and a fixed end, a position of the bent portion shifted while the movable end is moved.

In this case, since the elongated structure 1b for the movable section has the elongated flat belt-like configuration in which the plurality of sheath members 20 are arranged in parallel and securely attached to each other, the elongated structure 1b for the movable section cannot easily meander while the movable end is moved, and while the position of the bent portion 71 is shifted, and thus it is possible to stably carry out the movement of the movable end and the shift of the bent portion 71.

Also, in addition to the offset arrangement of the operational linear elements 5, 6, 7, 8, 9, 10 and 11, due to the provision of the high-stiffness members 25a, the bent portion 71 of the elongated structure 1b for the movable section can be maintained at the given curvature. Thus, it is possible to move the elongated structure 1b for the movable section within the predetermined area.

On the other hand, since the elongated structure 1b for the movable section can be integrally formed of a synthetic resin material, it is possible to suppress generation of motes and creation of noises as small as possible during the movement of the elongated structure 1b for the movable section.

Also, since the elongated structure 1b for the movable section is formed by securely attaching the sheath members 20, in which the respective operational linear elements 5, 6, 7, 8, 9, 10 and 11 are provided, to each other, it is possible to easily manufacture the elongated structure 1b for the movable section. Also, since it is possible to manufacture a sheath member 20, in which a operational linear element 5 is provided, by using a conventional apparatus for sheathing a conductive wire in a sheath, a new equipment cost is unnecessary.

Note, in this embodiment, although the high-stiffness members 25a are securely attached to the respective outermost ones of the sheath members 20, these high-stiffness members 25a may be securely attached to either the sheath members 20 or the gully-like grooves between the sheath members 20 at the side of the other ends 20b of the major axes. In this case, preferably, each of the high-stiffness members 25a is shaped so as to conform with a configuration of an area to which the high-stiffness member 25a concerned should be securely attached.

Also, in this embodiment, the high-stiffness members 25a are securely attached to the outermost sheath members 20 of the elongated structure 1b for the movable section, and thus that the elongated structure 1b for the movable section exhibits a characteristic so as to be easily bent in a given direction into the U-shape so that the surface 2a of the sheath member 2 is defined as the inner surface. Nevertheless, the present invention is not limited to only this. A high-stiffness portion having a larger stiffness than that of the remaining region of each of the sheath members 2 may be provided in the outer region 22 of each of the sheath members 2 as a substitute for the high-stiffness members 25a, and thus the elongated structure 1b for the movable section exhibits a characteristic so as to be bent in a given direction so that the one ends 20a of the major axes of the sheath members 20 are defined as the inner ends. Optionally, such a high-stiffness portion is used together with the high-stiffness members 25a.

Figure 4:
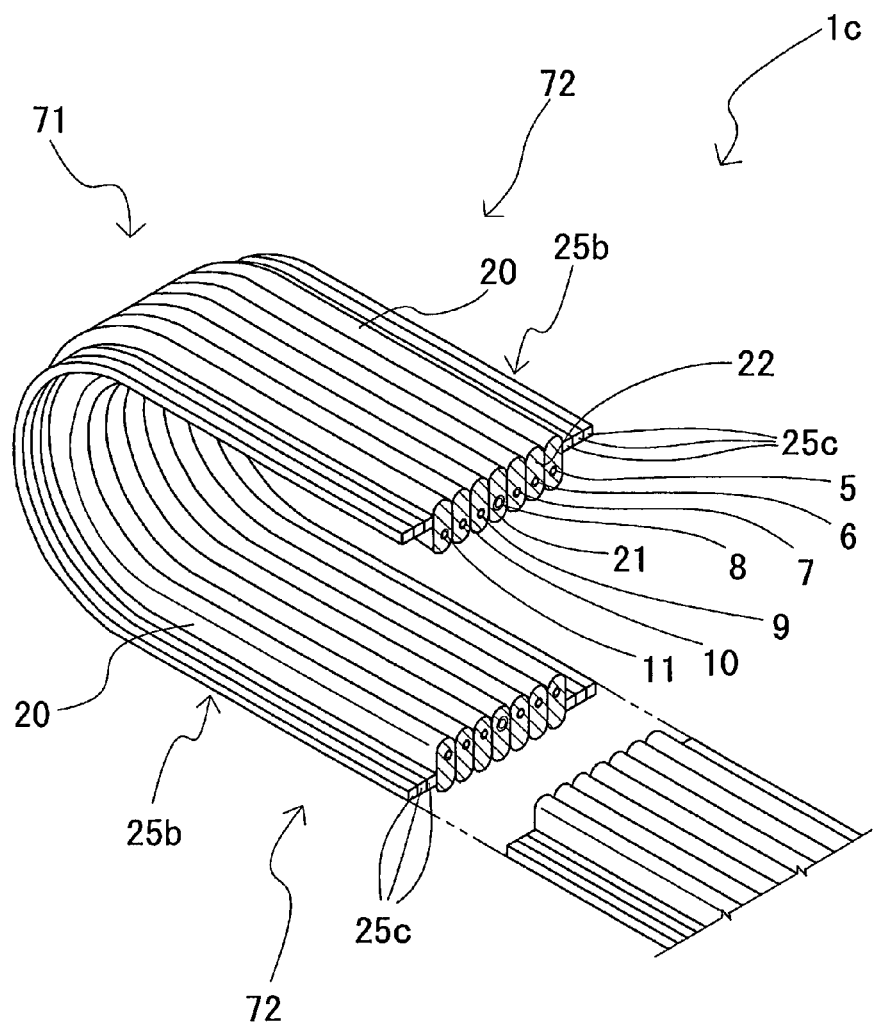
FIG. 4 is a schematic perspective view of the elongated structure for the movable section according to the third embodiment of the present invention, in which different high-stiffness members are used.

Further, as shown in FIG. 4, each of the high-stiffness members 25b may be formed of a plurality of separable stripes 25c, and thus a curvature of the bent portion 71 of the elongated structure 1c for the movable section can be regulated by separating at least one separable strips from each of the high-stiffness members 25b.

Also, in this embodiment, although a plurality of slits 3 as shown in FIG. 2 are not formed in the sheath members 20, the present invention is free from this limitation. That is, such slits may be formed in at least one of the sheath members 20 at a given pitch in a longitudinal direction.

Fourth Embodiment of the Invention

Figure 5:
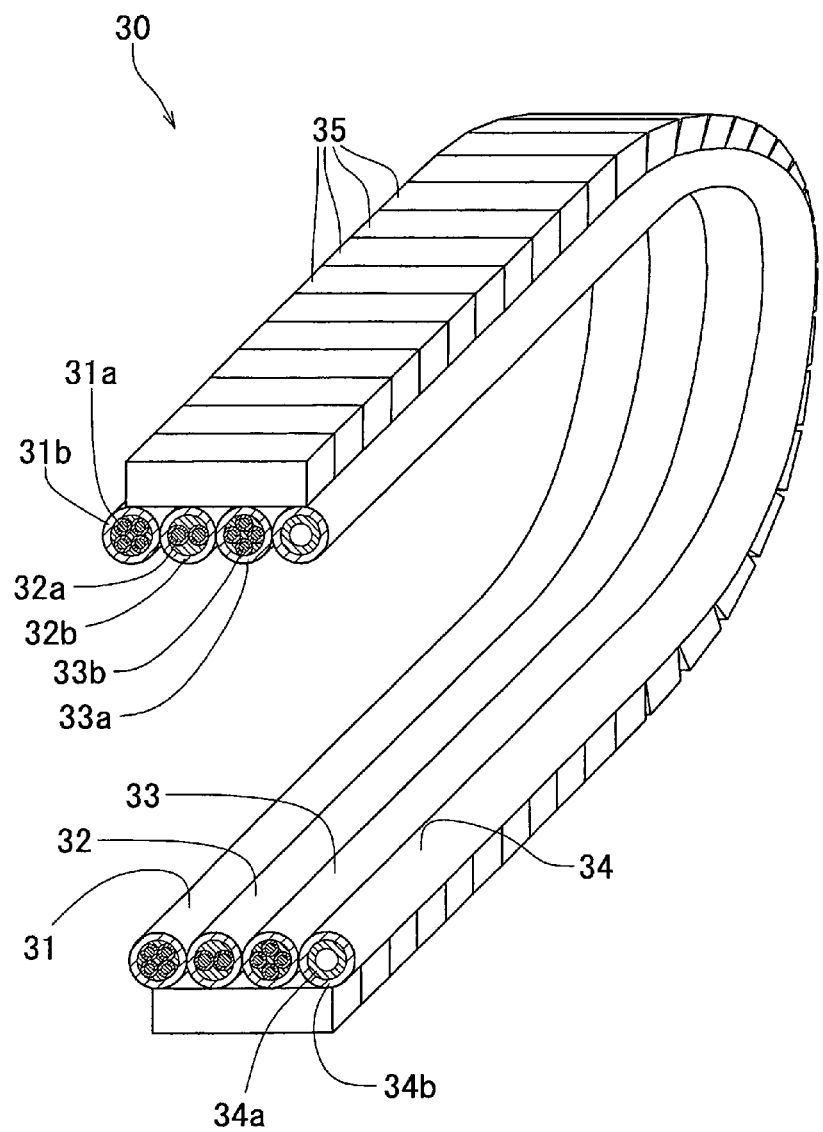
FIG. 5 is a schematic perspective view of an elongated structure for a movable section according to a fourth embodiment of the present invention.
Figure 6:
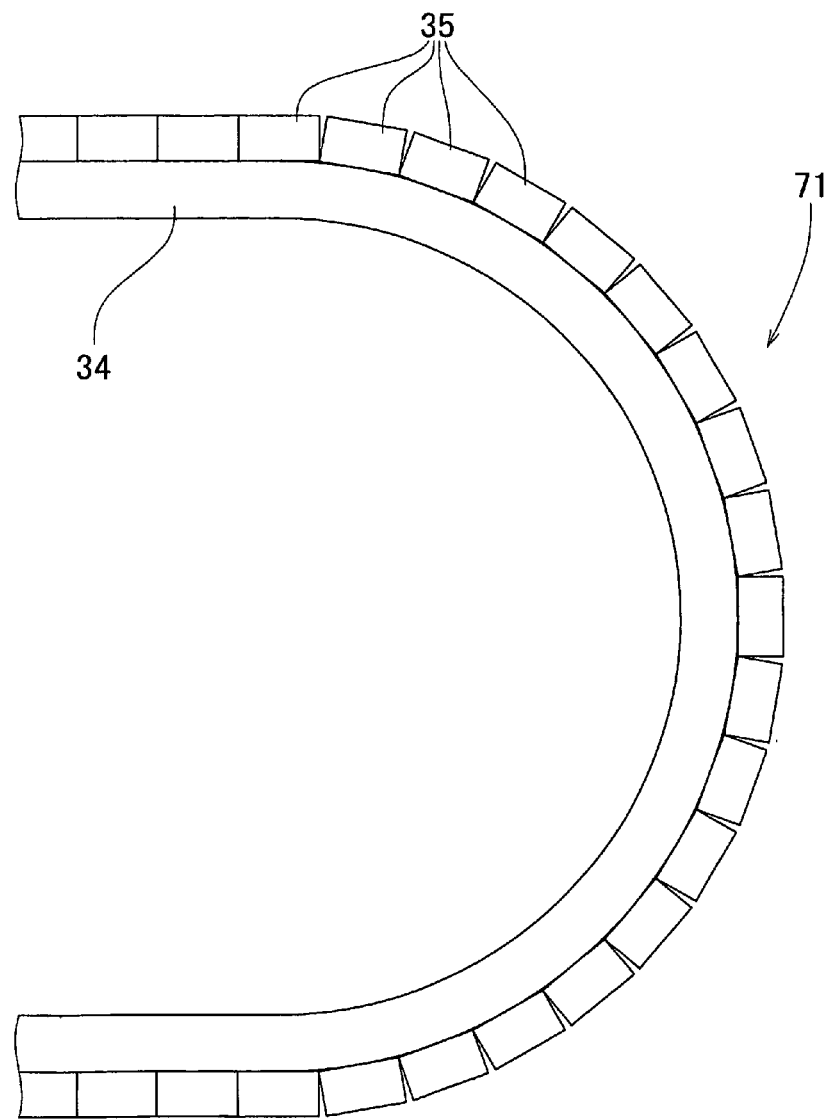
FIG. 6 is a side view of a bent portion of the elongated structure for the movable section according to the fourth embodiment of the present invention.

With reference to FIGS. 5 and 6, an elongated structure for a movable section according to a fourth embodiment of the present invention will now be explained.

In the drawings, an elongated structure 30 for a movable section includes a plurality of flexible cable members 31, 32, 33 and 34 containing at least one linear core element and/or at least one tube element, and a plurality of block members 35 which are securely attached to outer peripheral parts of the cable members 31, 32, 33 and 34 so that these cable members are united with each other, and which are closely and longitudinally arranged along the cable members 31, 32, 33 and 34.

The cable members 31, 32, 33 and 34 include operational linear elements through which operational factors are transmitted. In particular, each of the cable members 31, 32 and 33 includes at least one linear core elements 31a, 32a or 33a, through which electricity or light is transmitted as the operational factor, and which is sheathed with a sheath 31b, 32b or 33b. Also, the cable member 34 includes at least one tube element 34a, through which air or hydraulic oil is transmitted as the operational factor, and which is sheathed with a sheath 34b. The four cable members 31, 32, 33 and 34 having a circular cross-section is arranged in a belt-like configuration, and are securely attached to each other as a unit. Note, although the cable member 34 is formed by sheathing the tube element 34a with the sheath 34b, the cable member 34 may be constituted as a single tube member. In this case, the sheath 34b can be omitted, and the single tube member may be securely and directly attached to at least one of the cable members and the block members.

Each of the aforesaid block members 35 is constituted as a rectangular block which is formed of either the same material as that of the sheathes 31b, 32b, 33b and 34b or a material exhibiting affinity for an adhesive agent which is used when the rectangular blocks are adhered to the sheathes, with the affinity concerned being equivalent to or more than that for the sheathes. Each of the block members 35 has a length so as to be adjoined to all of the four cable members 31, 32, 33 and 34 arranged in parallel, and a thickness enough to exhibit a stiffness so that the block member cannot be easily deformed, whereby the plurality of block members 35 can be securely attached to the outer peripheral parts of the cable members 31, 32, 33 and 34 so that these cable members are united with each other.

Since the cable members 31, 32, 33 and 34 are arranged in parallel and securely attached so as to be united with each other, the cable members are easily bent in only the direction perpendicular to the direction in which the cable members are arranged in parallel, and thus it is hard to bend the cable members in the other directions. By securely attaching the block members 35 to the united cable members 31, 32, 33 and 34, it is possible to regulate the bend of the elongated structure 30 for the movable section, and thus the united cable members 31, 32, 33 and 34 exhibit a stiffness against the other bends except for the bend of the united cable members in which the surface of the united cable members, on which the block members 35 are provided, is defined as an outer surface. Namely, the united cable members 31, 32, 33 and 34 can be bent in only the bending direction so that the surface of the united cable members, on which the block members 35 are provided, is defined as the outer surface. Also, the bent portion of the united cable members 31, 32, 33 and 34 is maintained at a given curvature which is determined by the entire rigidity of the united cable members 31, 32, 33 and 34, and thus not only can a unintentional excess bend of the united cable members be prevented, but also it is possible to stably maintain the bent portion of the united cable members.

Although the elongated structure 30 for the movable section according to the embodiment is eventually used in a condition that the cable members 31, 32, 33 and 34 are adjoined to and united with the block members 35, the present invention is not limited to how these elements are united. Except that the cable members 31, 32, 33 and 34 are arranged in parallel and securely attached to each other, and then that the block members 35 are securely attached the cable members, a plurality of small block having a width equivalent to an outer diameter of the cable members 31, 32, 33 and 34 are securely attached to each of the cable members 31, 32, 33 and 34; the cable members 31, 32, 33 and 34 carrying the small block members are arranged in parallel; and then the cable members 31, 32, 33 and 34 are securely attached to each other to thereby produce the united cable members, while securely attaching the four small block members, which are widthwise aligned with each other, to each other to thereby produce the united small block members.

Next, an explanation will now be made how the elongated structure for the movable section according to this embodiment is used. Similar to the aforesaid first embodiment, the elongated structure 30 for the movable section is put within a predetermined area in a condition that it is bent into a U-shape. One end of the elongated structure 30 for the movable section is defined as a movable end, and the other end thereof is defined as a fixed end. As the movable end is moved, a position of the bent portion 71 is shifted. At this time, even if an outer force or the like is exerted on the elongated structure for the movable section so that the surface of the united cable members 31, 32, 33 and 34, on which the block members 35 are provided, is defined as the inner surface, the block members 35 are abutted against each other in the longitudinal direction of the united cable members so that the bend of the united cable members 31, 32, 33 and 34 is prevented.

On the other hand, when the elongated structure 30 for the movable section is bent into the U-shape, i.e., when the bend of the united cable members 31, 32, 33 and 34 is carried out so that the surface of the united cable members, on which the block members 35 are provided, is defined as the outer surface (see: FIGS. 5 and 6), the block members 35 can be separated from each other in the longitudinal direction of the united cable members, and thus the bend of the united cable members 31, 32, 33 and 34 cannot be hindered by the block members 35, to thereby allow the bend of the united cable members 31, 32, 33 and 34. As a result, the united cable members 31, 32, 33 and 34 can be bent only in the direction so that the surface of the united cable members, on which the block members 35 are provided, is defined as the outer surface. Accordingly, while the movable end of the elongated structure 30 for the movable section is moved, a unintentional and unnecessary bend of the elongated structure 30 for the movable section cannot take place so that the movement of the movable end can be stably carried out.

When the cable members 31, 32, 33 and 34 have the circular cross-section, attachment areas between the individual block members 35 and the united cable members are very small. Nevertheless, the portions of the block members 35, which are adjoined to the cable members 31, 32, 33 and 34, are formed of either the same material as that of the aforesaid sheathes or a material exhibiting affinity for an adhesive agent which is used when the block members are adhered to the sheathes, with the affinity concerned being equivalent to or more than that for the sheathes, whereby the cable members and the block members can be securely united with each other. Namely, the cable members and the block members can be reasonably united with each other, and the united structure can be surely maintained. Therefore, although the cable members 31, 32, 33 and 34 and the block members 35 are subjected to stress due to the fact that the position of the bent portion is continuously shifted while the movable end are moved, the block members can be prevented from coming off the cable members 31, 32, 33 and 34 and the block members 35 can maintain the function of regulating the bending direction as long as the life of the cable members 31, 32, 33 and 34.

As mentioned above, in the elongated structure for the movable section according to this embodiment, the plurality of block members 35 are closely and longitudinally arranged on the united cable members 31, 32, 33 and 34 containing the linear core elements and/or tube elements. Accordingly, even if it is tried that the united cable members 31, 32, 33 and 34 are bent so that the surface of the united cable members 31, 32, 33 and 34, on which the block members 31, 32, 33 and 34 are provided, is defined as the inner surface, the bend is prevented because the block members 35 are abutted against each other. On the other hand, when it is tried that the united cable members 31, 32, 33 and 34 are bent so that the surface of the united cable members 31, 32, 33 and 34, on which the block members 31, 32, 33 and 34 are provided, is defined as the outer surface, the block members 35 can be separated from each other, and thus the bend of the united cable members 31, 32, 33 and 34 cannot be hindered by the block members 35, to thereby allow the bend of the united cable members 31, 32, 33 and 34. In short, the united cable members 31, 32, 33 and 34 can be bent only in the direction so that the surface of the united cable members, on which the block members 35 are provided, is defined as the outer surface. Accordingly, while the movable end of the elongated structure 30 for the movable section is moved, a unintentional and unnecessary bend of the elongated structure 30 for the movable section cannot take place so that the movement of the movable end can be stably carried out. In addition, a protective guide structure is not needed, and not only can an installing space for the elongated structure for the movable section become smaller, but also it is possible to cut down a cost necessary for such a protective guide structure.

Figure 7:
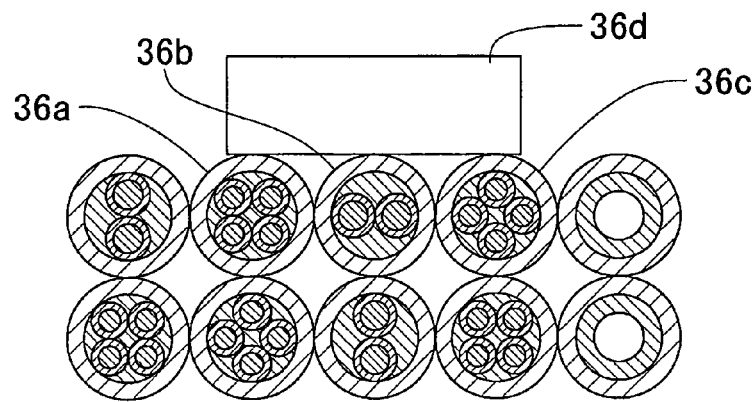
FIG. 7 is a cross-sectional view of a first modification of the elongated structure for the movable section according to the fourth embodiment of the present invention.

Note, in the elongated structure for the movable section according to this embodiment, although the four cable members 31, 32, 33 and 34 are provided in parallel to form the belt-like shape, and although the block members 35 are attached to the cable members 31, 32, 33 and 34, the present invention is not limited to only this. Only one flexible cable member may be used, or more than four flexible cable members may be arranged in parallel. Also, although the block members are adjoined to all of the cable members provided in parallel, the present invention is not limited to only this. As shown in FIG. 7, block members 36d may be adjoined and attached to only flexible cable members 36a, 36b and 36c which form a part of a plurality of flexible cable members provided in parallel.

Figure 8:
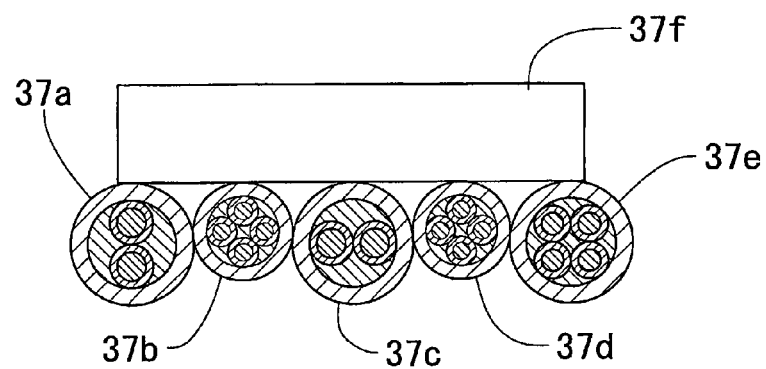
FIG. 8 is a cross-sectional view of a second modification of the elongated structure for the movable section according to the fourth embodiment of the present invention.
Figure 9:
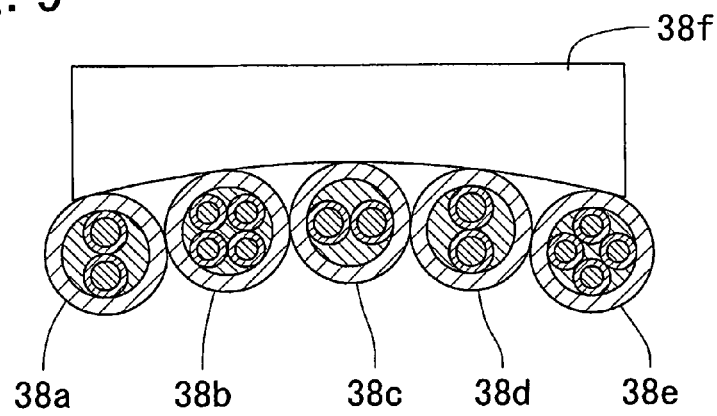
FIG. 9 is a cross-sectional view of a third modification of the elongated structure for the movable section according to the fourth embodiment of the present invention.

Also, in the elongated structure for the movable section according to this embodiment, although the four cable members 31, 32, 33 and 34 having the same outer diameter are provided in parallel to form the belt-like shape, the present invention is not limited to only this. As shown in FIG. 8, a part of flexible cable members 37a, 37b, 37c and 37d may have a different diameter or all of these cable members may have different diameters, and the cable members are arranged in parallel, and are securely attached to a plurality of block members 37f so as to obtain a united structure. Also, although the cable members 31, 32, 33 and 34 are arranged in parallel so as to be laterally aligned with each other, the present invention is limited to this arrangement. According to conditions that an elongated structure for the movable section is used, as shown in FIG. 9, flexible cable members 38a, 38b, 38c and 38d may be arranged in parallel along a curved line. In this case, a surface of block members 38f is formed as a curved surface which confirms with the curved arrangement of the cable members 38a, 38b, 38c and 38d, and these cable members are arranged along the curved surface of the block member.

Fifth Embodiment of the Invention

Figure 10:
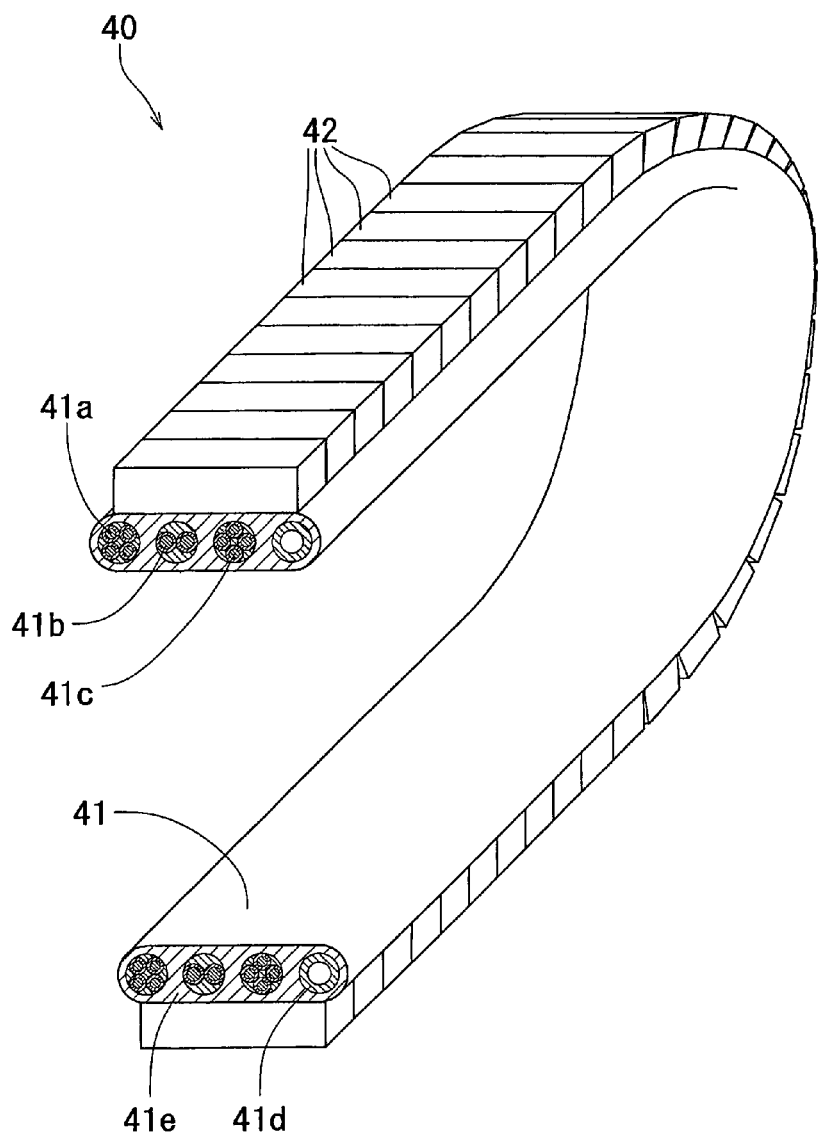
FIG. 10 is a schematic perspective view of an elongated structure for a movable section according to a fifth embodiment of the present invention.

With reference to FIG. 10, an elongated structure for a movable section according to a fifth embodiment of the present invention will now be explained.

In FIG. 10, the elongated structure 40 for the movable section includes a belt-like flexible cable member 41 containing linear core elements and/or tube elements, and a plurality of block members 42 which are securely attached to a part of an outer peripheral part of the cable member 41, and which are closely and longitudinally arranged along the cable member 41.

The aforesaid cable member 41 is formed as a belt-like member having a predetermined thickness, and includes operational linear elements through which operational factors are transmitted, i.e., linear core elements 41a, 41b and 41c through which electricity and light are transmitted as the operational factors, and/or a tube element 41d through which air or hydraulic oil is transmitted as the operational factor, with the linear core elements and the tube element being sheathed in a sheath (sheath member) 41e. The linear core elements and the tube element are sorted by a kind, a function and so on, and are arranged widthwise in parallel in the cable member.

Each of the block members 42 is defined as a rectangular block which is formed of a material having the same or larger hardness as or than that of the cable member 41. Also, each of the block members 42 has a length which is generally equivalent to a width of the cable member 41, and a suitable thickness enough to exhibit a stiffness so that the block members cannot be easily deformed, and the block members are securely attached to the outer peripheral part of the cable member 41.

Next, an explanation will now be made how the elongated structure for the movable section according to this embodiment is used. As shown in FIG. 10, similar to the aforesaid first embodiment, the elongated structure 40 for the movable section is put within a predetermined area in a condition that it is bent into a U-shape. One end of the elongated structure 40 for the movable section is defined as a movable end, and the other end thereof is defined as a fixed end. As the movable end is moved, a position of the bent portion is shifted. In this case, although the cable member 41 is subjected to an external force for bending the cable member 41 so that the surface of the cable member 41, on which the block members are provided, is defined as an inner surface, the bend of the cable member 41 is prevented because the block members 42, which are hard to be deformed, are abutted against each other.

On the other hand, when the cable member 41 is bent into the U-shape, as stated above, i.e., when the cable member 41 is bent so that the surface of the cable member 41, on which the block members 42 are provided, is defined as an outer surface, the block members 42 are separated from each other, and thus the bend of the cable member 41 cannot be hindered by the block members 35, to thereby allow the bend of the cable member 41. As a result, the cable member 41 can be bent only in the direction so that the surface of the united cable members, on which the block members 35 are provided, is defined as the outer surface. Accordingly, while the movable end of the elongated structure 40 for the movable section is moved, a unintentional and unnecessary bend of the elongated structure 40 for the movable section cannot take place so that the movement of the movable end can be stably carried out.

Note, since a sufficient contact area between the belt-like cable member 41 and the block members 42 can be obtained, even if the material of the cable member 41 is different from that of the block members 42, it is possible to securely unite the cable member 41 and the block members 42 by adhering each of the block members to the cable member, using a suitable adhesive agent, and the united cable members and block members can be surely maintained. Therefore, although the cable member 41 and the block members 42 are subjected to stress due to the fact that the position of the bent portion is continuously shifted while the movable end are moved, the block members can be prevented from coming off the cable members 41, and the block members 42 can maintain the function of regulating the bending direction as long as the life of the cable member 41.

As mentioned above, in the elongated structure for the movable section according to this embodiment, the block members 42 have a stiffness which is equivalent to or larger than that of the cable member 41. Accordingly, even if it is tried that the cable member 41 is bent so that the surface of the cable member 41, on which the block members 42 are provided, is defined as the inner surface, the bend is prevented because the block members 35 are hard to be deformed although they are subjected to forces. Thus, it is possible to surely maintain the state in which the cable member 41 is bent only in the direction that the surface of the cable member, on which the block members 42 are provided, is defined as the outer surface. Therefore, while the movable end of the elongated structure 40 for the movable section is moved, a unnecessary bend of the elongated structure 40 for the movable section cannot take place so that not only can the position of the bent portion be smoothly shifted, but also the movement of the elongated structure 40 for the movable section can be stably carried out.

Sixth Embodiment of the invention

Figure 11:
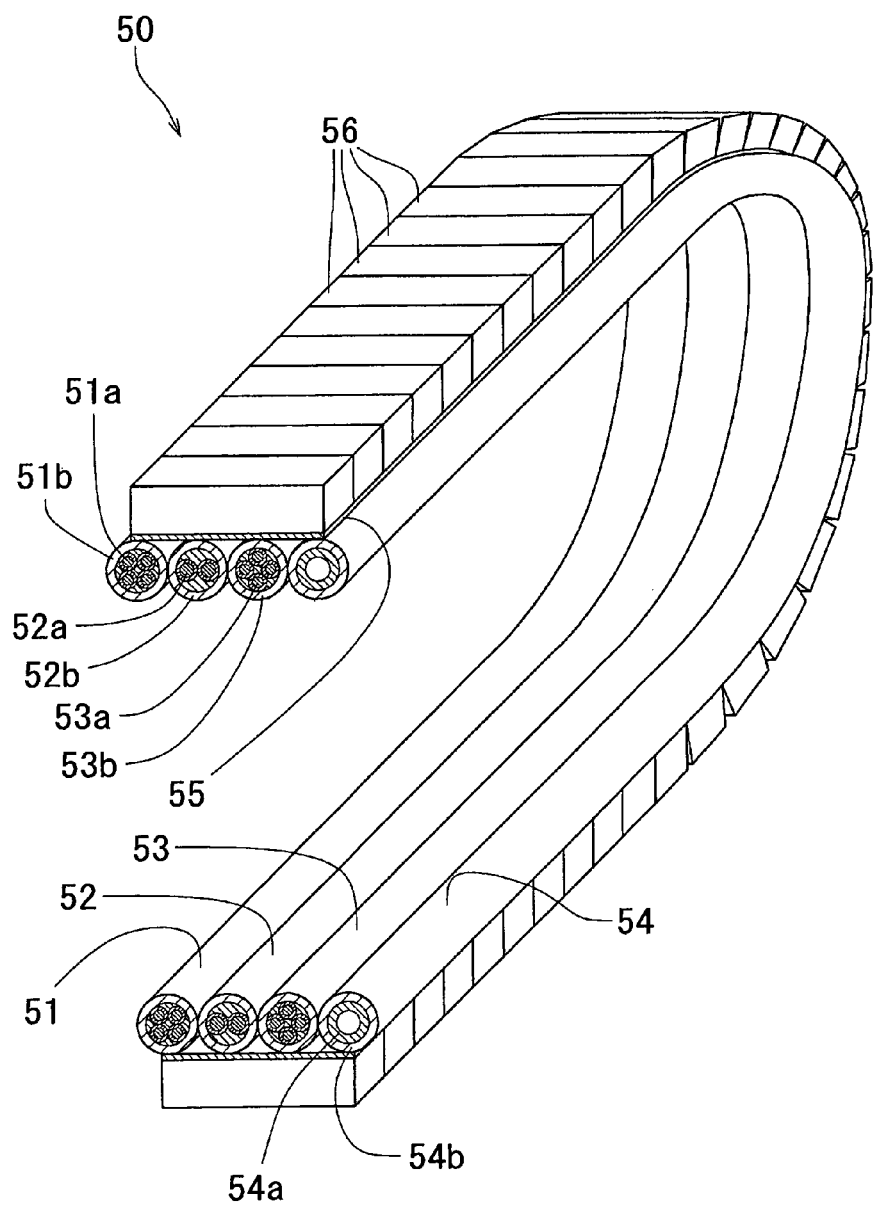
FIG. 11 is a schematic perspective view of an elongated structure for a movable section according to a sixth embodiment of the present invention.

With reference to FIG. 11, an elongated structure for a movable section according to a sixth embodiment of the present invention will now be explained.

In FIG. 11, an elongated structure 50 for a movable section includes a plurality of flexible cable members 51, 52, 53 and 54, each of which contains at least one linear core element and/or at least one tube element, a belt-like sheet member 55 which is securely attached to a part of an outer peripheral part of each of the cable members 51, 52, 53 and 54 so as to longitudinally extend along the cable members, and a plurality of block members 56 which are securely attached to a surface of the sheet member 55, and which are closely and longitudinally arranged along the sheet member 55.

The aforesaid cable members 51, 52, 53 and 54 includes operational linear elements through which operational factors are transmitted, i.e., linear core elements 51a, 52a and 53a through which electricity and light are transmitted as the operational factors, and/or a tube element 54a through which air or hydraulic oil is transmitted as the operational factor, with the linear core elements 51a, 52a and 53a and the tube element 54a being sheathed in respective sheathes 51b, 52b, 53b and 54b. Note, similar to the aforesaid fourth embodiment, the cable members 51, 52, 53 and 54 having a circular cross-section are arranged in parallel so as to define a belt-like configuration, and are securely attached to each other. Similar to the aforesaid embodiment, when a flexible cable member comprises only one tube element, it is possible to omit a sheath, and the tube element concerned may be directly attached to another flexible cable member and the sheet member.

The aforesaid sheet member 55 is formed of either the same material as that of the sheathes 51b, 52b, 53b and 54b or a material exhibiting affinity for an adhesive agent which is used when the sheet member is adhered to the sheathes, with the affinity concerned being equivalent to or more than that for the sheathes. The sheet member 55 has a width so as to be adjoined to all of the four cable members 51, 52, 53 and 54 arranged in parallel, and a thickness as to be easily deformed such that the bend of the flexible cable members is negatively influenced, and the sheet member 55 are integrally attached to the outer peripheral part of the cable members 51, 52, 53 and 54.

Each of the block members 56 is defined as a rectangular block which is formed of a material having the same or larger hardness as or than that of the cable members 51, 52, 53 and 54 and the sheet member 55. Also, each of the block member 56 has a length which is substantially equivalent to a width of the sheet member 55, and a suitable thickness enough to exhibit a stiffness so that the block members cannot be easily deformed, and the block members are securely attached to the surface of the sheet member 55.

Next, an explanation will now be made how the elongated structure for the movable section according to this embodiment is used. Similar to the aforesaid first embodiment, as shown in FIG. 11, the elongated structure 50 for the movable section is put within a predetermined area in a condition that it is bent into a U-shape. One end of the elongated structure 50 for the movable section is defined as a movable end, and the other end thereof is defined as a fixed end. As the movable end is moved, a position of the bent portion is shifted. At this time, even if an outer force or the like is exerted on the elongated structure for the movable section so that the surface of the united cable members 51, 52, 53 and 54, on which the block members 56 are provided, is defined as an inner surface, the block members 56 are abutted against each other in the longitudinal direction of the cable members so that the bend of the cable members 51, 52, 53 and 54 is hindered and prevented by the block members.

On the other hand, when the elongated structure 50 for the movable section is bent into the U-shape, i.e., when the bend of the cable members 51, 52, 53 and 54 is carried out so that the surface of the cable members, on which the block members 56 are provided, is defined as an outer surface, the block members 56 can be separated from each other in the longitudinal direction of the cable members, and thus the bend of the united cable members 51, 52, 53 and 54 cannot be hindered by the block members 56, to thereby allow the bend of the cable members 51, 52, 53 and 54. As a result, the cable members 51, 52, 53 and 54 can be bent only in the direction so that the surface of the cable members, on which the block members 56 are provided, is defined as the outer surface. Accordingly, while the movable end of the elongated structure 50 for the movable section is moved, a unintentional and unnecessary bend of the elongated structure 50 for the movable section cannot take place so that the movement of the movable end can be stably carried out.

Note, due to the fact that the sheet member 55 is intervened between the cable members 51, 52, 53 and 54 and the block members 56, it is possible to obtain the maximum portion of the sheet member 55 which is adjoined to the cable members 51, 52, 53 and 54. Thus, these elements can be securely attached to and united with each other, and this united structure can be surely maintained. Also, it is possible to obtain a sufficient contact area between the sheet member 55 and the block members 56 so that they can be united with the block member by a suitable adhesive agent or the like, and this united structure can surely maintained. Therefore, although the position of the bent portion is continuously shifted while the movable end are moved, so that the cable members 51, 52, 53 and 54 and the block members 56 are subjected to stress, the block members can be prevented from coming off the cable members 51, 52, 53 and 54 and the block members 56 can maintain the function of regulating the bending direction as long as the life of the cable members 51, 52, 53 and 54.

In the elongated structure for the movable section according to this embodiment, if the cable members 51, 52, 53 and 54 and the block members 56, which are formed of different materials, are directly united with each other, and if it is impossible to obtain a sufficient contact area between the cable members 51, 52, 53 and 54 and the block members 56, an enough attachment strength cannot be expected. Nevertheless, since the sheet member 55 is intervened between the cable members 51, 52, 53 and 54 and the block members 56, the block members 56 can be closely contacted with the sheet member 55. Thus, it is possible to obtain a large adhesive area between the sheet member 55 and the block members 56, so that the block members 56 can be adhered with a suitable adhesive strength to the sheet member 55 which is strongly united with the outer peripheral parts of the cable members 51, 52, 53 and 54. As a result, the block members 56 and the cable members 51, 52, 53 and 54 can be strongly united with each other, and thus it is possible to use the elongated structure 50 for the movable section without any problems under the condition that the position of the bent portion is continuously shifted.

Note, in the elongated structures for the movable section according to the fourth, fifth and sixth embodiments, although a solid block member, which is hard to be deformed, is used as each of the block members arranged on the cable members, the present invention is not limited to only this. Each of the block members may be formed as a hollow block member having wall portions which are contacted with another hollow block member to be adjoined thereto. Also, each of the block members may be widthwise divided into small pieces with respect to the cable members, and the divided small pieces are widthwise arranged to be spaced from each other so that it is possible to maintain the function of regulating the bend of the cable members, which is obtained by the block members. Thus, it is possible to lighten the block members so that the whole weight of the elongated structure for the movable section can be reduced. Accordingly, not only can the elongated structure for the movable section exhibit a superior manipulability when it is installed in an apparatus, but also it is possible to suppress a load to be exerted on a movable section of such an apparatus in which the elongated structure for the movable section is used.

Also, in the elongated structures for the movable section according to the fourth, fifth and sixth embodiments, although the cable members contain only the linear core elements and/or the tube element, the present invention is not limited to only this. A linear element except for the operational linear elements such as the linear core elements and/or the tube element, for example, a tension member or the like for reinforcing and regulating the stiffness and the elasticity of the cable members may be provided in the cable members, whereby it is possible to limit a bending direction of the elongated structure for the movable section in conjunction with the block members so that not only can a unintentional and unnecessary bend of the elongated structure for the movable section be prevented, but also the bent portion can be set at a given curvature by regulating the rigidity of the cable members.

Figure 12:
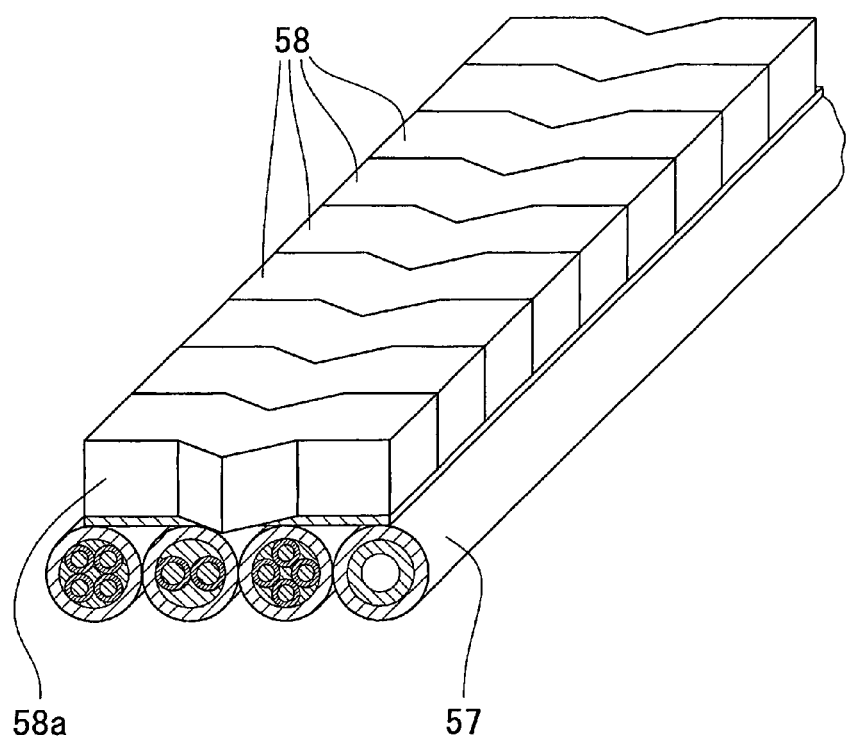
FIG. 12 is a schematic perspective view showing a main part of an elongated structure for a movable section according to another embodiment of the present invention.

Further, in the elongated structures for the movable section according to the fourth, fifth and sixth embodiments, although each of the block members arranged on the cable members has contact faces defined as simple flat faces, each of which is contacted with the contact face of an adjoining flexible cable member, the present invention is not limited to only this. As shown in FIG. 12, each of block members 58 may have contact faces 58a, each of which is defined by a combination of some flat face parts and/or some curved face parts, so that the respective contact faces have a convex portion and a concave portion which are complementarily engaged with each other when adjoining block members are contacted with each other. Thus, the contact area between the adjoining block members becomes larger in comparison with the case where the block members have the simple flat contact faces. Accordingly, although forces or the like are exerted on the elongated structure for the movable section to thereby cause a unintentional and unnecessary bend in the elongated structure for the movable section, the forces are dispersed by the adjoining block members abutted against each other so that the block members are more hard to be deformed, resulting in improvement of a bending-prevention effect of the cable members 57.

Figure 13:
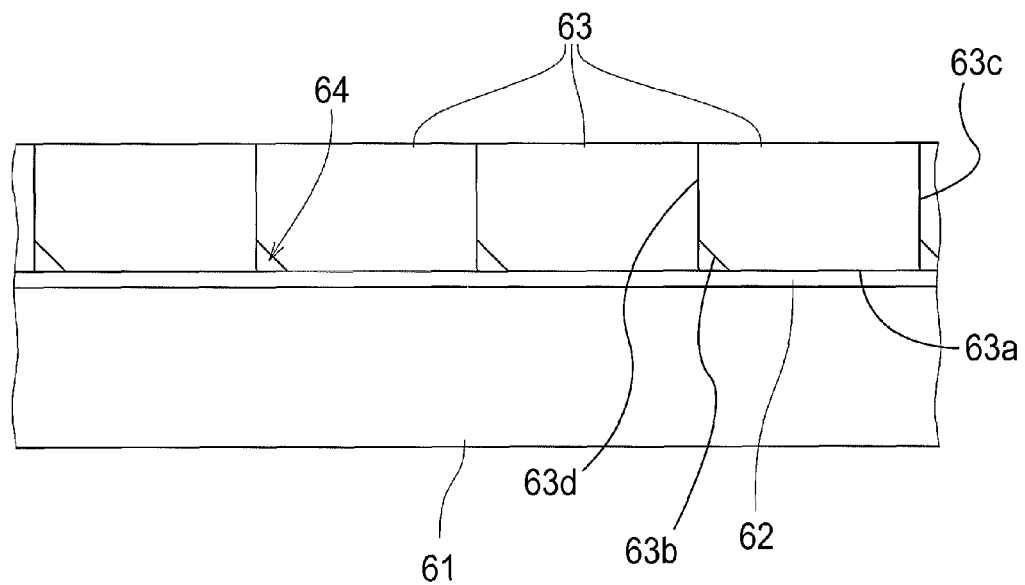
FIG. 13 is a side view showing a main part of an elongated structure for a movable section according to yet another embodiment of the present invention.

Further, in the elongated structures for the movable section according to the fourth, fifth and sixth embodiments, although each of the block members arranged on the cable members is configured as a simple rectangular block member, the present invention is not limited to only this. As shown in FIG. 13, each one of the plurality of block members 36 has a flat attachment surface 63*a* and a chamfered surface 63*b*. The flat attachment surface 63*a* is connected to and extends perpendicularly from a flat rear surface 63*c* and extends forwardly towards a flat front surface 63*d*. The chamfered surface 63*b* is connected to and between the flat attachment surface 63*a* and the flat front surface 63*d* and extends at an angle relative to and between the flat attachment surface 63*a* and the flat front surface 63*d*. Also, as illustrated in FIG. 13, in each of block members 63, a side edge defining an adhesive face of the block member, which is securely adhered to and united with either flexible cable 61 members or a sheet member 62, may be chamfered so that a spatial region 64 is defined between adjoining block members 63. Thus, when the block members 63 are securely adhered to and united with either the cable members 61 or the sheet member 62 by using an adhesive agent, a part of the adhesive agent can be squeezed from the contact area between each of the block member 62 and either the cable members 61 or the sheet member 62, is prevented from being penetrated into a clearance between adjoining block members 63 longitudinally arranged along the cable members 61 due to the existence of the spatial region 64, whereby the adjoining block members can be prevented from being accidentally adhered to each other. Accordingly, when the cable members 61 are bent so that the surface of the cable members, on which the block members 63 are provided, is defined as an outer surface, the block members 63 are surely separated from each other, and thus it is possible to ensure and maintain a condition in which the bend of the cable members cannot be hindered.

Further, in the elongated structures for the movable section according to the fourth, fifth and sixth embodiments, although each of the cable members has a simple circular cross-section, the present invention is not limited to only this. Each of the cable members may have another cross-section, for example, a polygonal cross-section such as a square cross-section, and may have a cross-section featuring a distinction-purpose groove or protrusion.

REFERENCE SIGNS LIST

1, 1*a*, 1*b* and 1*c* Elongated structure
2 Sheath member
2*a* One surface
2*b* Other surface
2*c* One side face
2*d* Other side face
3 Slit
5, 6, 7, 8, 9, 10 and 11 Operational linear element
20 Sheath member
20*a* One end of major axis
20*b* Other end of major axis
21 Inner region
22 Outer region
25 High-stiffness portion
25*a* and 25*b* High-stiffness member
25*c* Separable stripe
30, 40 and 50 Elongated structure
31, 32, 33 and 34 Cable member
31*a*, 32*a* and 33*a* Linear core element
31*b*, 32*b*, 33*b* and 34*b* Sheath
34*a* Tube element
35 Block member
36*a*, 36*b* and 36*c* Cable member
36*d* Block member
37*a*, 37*b*, 37*c*, 37*d* and 37*e* Cable member
37*f* Block member
38*a*, 38*b*, 38*c*, 38*d* and 38*e* Cable member
38*f* Block member,
41 Cable member
41*a*, 41*b* and 41*c* Linear core element
41*d* Tube element
41*e* Sheath
42 Block member
51, 52, 53 and 54 Cable member
51*a*, 52*a*, 53*a* Linear core element
54*a* Tube element
51*b*, 52*b*, 53*b* and 54*b* Sheath
55 Sheet member
56 Block member
57 Cable member
58 Block member
58*a* Contact face
61 Cable member
62 Sheet member
63 Block member
64 Spatial region
71 Bent portion
72 Linear portion

The invention claimed is:

1. An elongated structure for a movable section comprising:
a plurality of flexible cable members, each flexible cable member including a hollow, tubular sheath element extending along and about an elongated central axis, the hollow, tubular sheath element having an outer peripheral surface disposed apart from and encircling the elongated central axis as viewed in cross-section the outer peripheral surface having an attachment part and an unattached part, the attachment part extending parallel to and along the elongated central axis and defining an arcuate peripheral surface portion as viewed in cross-section, the unattached part extending parallel to and along the elongated central axis and defining a substantially circular peripheral surface portion, the attachment part defining the arcuate peripheral surface portion and the unattached part defining the substantially circular peripheral surface portion being connected to each other, as viewed in cross-section, in a continuous loop to form a circle; and
a plurality of block members, respective ones of the plurality of block members being individual solid bodies of integral construction having opposing flat front and flat rear surfaces and opposing flat first and flat second surfaces disposed between and connected to the opposing flat front and flat rear surfaces to form a rectangular shape as viewed in side elevation,
wherein respective ones of said plurality of flexible cable members are attached at the attachment part to respective ones of the plurality of block members on the flat first surfaces thereof in a juxtaposed manner as viewed in cross-section,
wherein respective ones of the flat front surfaces are in facial contact with respective ones of the flat rear surfaces to define at least a portion of the elongated structure being in a longitudinally straight condition and respective ones of the flat front surfaces and flat rear surfaces are facially disposed apart from one another to form a generally V-shaped groove therebetween as viewed in side elevation to define at least another portion of the elongated structure being bent into a bent condition and wherein each hollow, tubular sheath element contains at least one of a linear core element and a tube element thereinside.

2. The elongated structure for the movable section as set forth in claim 1, wherein the plurality of flexible cable members are arranged in parallel to define a belt-like configuration, two adjoining cable members being securely attached to and united with each other, and said plurality of block members are arranged so as to be adjoined to said plurality of cable members arranged in parallel.

3. The elongated structure for the movable section as set forth in claim 1, wherein each one of said plurality of flexible cable members is formed so as to have a single belt-like configuration, and the at least one of a linear core element and a tube element contains a plurality of linear core elements and a plurality of tube elements all arranged in said plurality of flexible cable members in parallel.

4. The elongated structure for the movable section as set forth in claim 1, wherein said plurality of block members have a larger rigidity than that of said plurality of flexible cable members.

5. The elongated structure for the movable section as set forth in claim 1, further comprising a flexible sheet member intervened between said plurality of block members and said plurality of flexible cable members.

6. The elongated structure for the movable section as set forth in claim 1, wherein each one of the plurality of block members is rectangularly-shaped as viewed in side elevation and has said flat front surface and said opposing flat rear surface, each one of the plurality of block members has a forward section projecting forwardly from the flat front surface and a corresponding groove formed into the opposing flat rear surface and disposed behind the forward section as viewed in plan view.

7. The elongated structure for the movable section as set forth in claim 1, wherein each one of the plurality of block members is rectangularly-shaped as viewed in side elevation and has said flat front surface and said opposing flat rear surface, each one of the plurality of block members has a flat attachment surface and a chamfered surface, the flat attachment surface is connected to and extends perpendicularly from the opposing flat rear surface and extends forwardly towards the flat front surface and the chamfered surface is connected to and between the flat attachment surface and the flat front surface and extends at an angle relative to and between the flat attachment surface and the flat front surface as viewed in side elevation.

\* \* \* \* \*